(12) United States Patent
Abraham et al.

(10) Patent No.: US 8,964,635 B2
(45) Date of Patent: Feb. 24, 2015

(54) METHOD AND SYSTEM FOR DETERMINING A LOCATION OF A DEVICE USING FEMTOCELL INFORMATION

(75) Inventors: Charles Abraham, Los Gatos, CA (US); Xuemin Chen, Rancho Santa Fe, CA (US); Wael William Diab, San Francisco, CA (US); Vinko Erceg, Cardiff, CA (US); Victor Hou, LaJolla, CA (US); Jeyhan Karaoguz, Irvine, CA (US); Mark Kent, Vista, CA (US)

(73) Assignee: Broadcom Corporation, Irvine, CA (US)

( * ) Notice: Subject to any disclaimer, the term of this patent is extended or adjusted under 35 U.S.C. 154(b) by 1148 days.

(21) Appl. No.: 12/418,257

(22) Filed: Apr. 3, 2009

(65) Prior Publication Data
US 2010/0254355 A1 Oct. 7, 2010

(51) Int. Cl.
*H04W 24/00* (2009.01)
*H04W 64/00* (2009.01)
*H04W 84/04* (2009.01)

(52) U.S. Cl.
CPC ............ *H04W 64/00* (2013.01); *H04W 84/045* (2013.01)
USPC ...................... 370/328; 455/456.1; 455/456.3; 455/456.5

(58) Field of Classification Search
None
See application file for complete search history.

(56) References Cited

U.S. PATENT DOCUMENTS

| | | | |
|---|---|---|---|
| 7,773,572 B2 * | 8/2010 | O'Neil et al. ................. 370/338 |
| 2003/0058834 A1 * | 3/2003 | Soulie et al. .................. 370/350 |
| 2006/0262731 A1 * | 11/2006 | Carlson et al. ................ 370/252 |
| 2007/0254620 A1 * | 11/2007 | Lindqvist et al. ............. 455/403 |
| 2008/0227463 A1 * | 9/2008 | Hizume et al. ............. 455/456.1 |
| 2009/0047931 A1 * | 2/2009 | Nanda et al. .................. 455/411 |
| 2010/0027521 A1 * | 2/2010 | Huber et al. .................. 370/338 |
| 2010/0069066 A1 * | 3/2010 | Shen et al. .................... 455/434 |
| 2010/0073229 A1 * | 3/2010 | Pattabiraman et al. .. 342/357.09 |
| 2010/0120394 A1 * | 5/2010 | Mia et al. ................... 455/404.2 |
| 2010/0190496 A1 * | 7/2010 | Chinnathambi ........... 455/435.1 |

* cited by examiner

*Primary Examiner* — Christine Duong
(74) *Attorney, Agent, or Firm* — Sterne, Kessler, Goldstein & Fox PLLC

(57) ABSTRACT

Aspects of a method and system for determining a location of a device using femtocell information are provided. In this regard, a femtocell management entity may be operable to receive global navigation system satellite (GNSS) coordinates of one or more of a plurality of femtocells and one or both of a receive signal strength indication (RSSI) and/or power levels of one or more of the plurality of femtocells, which are managed by the femtocell management entity. The femtocell management entity may be operable to determine a location of a communication device that is derived based on the received GNSS coordinates, RSSI and/or power levels of one or more of the plurality of femtocells and communicate the determined location to a communication device. One or more location based applications and/or services within the communication device may be operable to utilize the received determined location to provide mapping and/or location information.

16 Claims, 6 Drawing Sheets

METHOD AND SYSTEM FOR DETERMINING A LOCATION OF A DEVICE USING FEMTOCELL INFORMATION

CROSS-REFERENCE TO RELATED APPLICATIONS/INCORPORATION BY REFERENCE

Not Applicable

FIELD OF THE INVENTION

Certain embodiments of the invention relate to communications. More specifically, certain embodiments of the invention relate to a method and system for determining a location of a device using femtocell information.

BACKGROUND OF THE INVENTION

A femtocell is a small base station that may be placed in a customer's residence or in a small business environment, for example. Femtocells may be utilized for off-loading macro radio network facilities, improving coverage locally in a cost-effective manner, and/or implementing home-zone services to increase revenue. Femtocells, like macro base stations, may be enabled to connect "standard" phones to a cellular provider's network by a physical broadband connection which may be a digital subscriber line (DSL) connection, a cable connection and/or fiber connection, for example. Since the traffic between a customer's premises femtocell equipment and the operator's network may be traversing a public network, the traffic may be prone to various risks.

Communication between femtocells and one or more cellular provider's networks enables operation in private and public areas. The capacity of a femtocell may be adequate to address a typical family use model supporting two to four simultaneous voice calls and/or data, for example.

An important characteristic of femtocells is their ability to control access. In an open access scenario, any terminal and/or subscriber of a cellular base station may be allowed to communicate with the femtocell. Accordingly, the femtocell usage may somewhat resemble that of a macrocellular system. In a closed access scenario, the femtocell may serve a limited number of terminals and/or subscribers that may be subscribed to a given cellular base station. In this regard, the cellular base station may be perceived as being deployed for private usage.

A regulatory issue with regard to femtocells is that they use licensed frequencies that radiate at a very low power in a controlled environment. It may be likely that they may not require a license from a local authority, as macrocellular base stations do. An additional regulatory issue may arise from the relationship between a femtocell operator and a broadband services operator. One possible scenario may include the broadband operator being unaware of the existence of a femtocell operator. Conversely, the broadband operator and femtocell operator may have an agreement or they may be the same operator, for example. Interference between femtocells may be an issue for femtocell deployments based on wideband technologies such as WCDMA, OFDM, for example, because initial operator deployments may use the same frequency for both the femtocell and the macrocellular networks or due to the proximity of femtocell base stations in dense urban areas There are a plurality of design models for deployment and integration of femtocells, for example, an IP based Iu-b interface, a session initiation protocol (SIP) based approach using an Iu/A interface, use of unlicensed spectrum in a technique known as unlicensed mobile access (UMA) and/or use of IP multimedia subsystem (IMS) voice call continuity (VCC), for example.

In an Iu-b model based femtocell deployment approach, femtocells may be fully integrated into the wireless carrier's network and may be treated like any other remote node in a network. The Iu-b protocol may have a plurality of responsibilities, such as the management of common channels, common resources, and radio links along with configuration management, including cell configuration management, measurement handling and control, time division duplex (TDD) synchronization, and/or error reporting, for example. In Iu-b configurations, mobile devices may access the network and its services via the Node B link, and femtocells may be treated as traditional base stations.

In a SIP based femtocell deployment approach, a SIP client, embedded in the femtocell may be enabled to utilize SIP to communicate with the SIP-enabled mobile switching center (MSC). The MSC may perform the operational translation between the IP SIP network and the traditional mobile network, for example.

In a UMA based femtocell deployment approach, a generic access network (GAN) may offer an alternative way to access GSM and GPRS core network services over broadband. To support this approach, a UMA Network Controller (UNC) and protocols that guarantee secure transport of signaling and user traffic over IP may be utilized. The UNC may be enabled to interface into a core network via existing 3GPP interfaces, for example, to support core network integration of femtocell based services by delivering a standards based, scalable IP interface for mobile core networks.

In an IMS VCC based femtocell deployment approach, VCC may provide for a network design that may extend an IMS network to include cellular coverage and address the handoff process. The IMS VCC may be designed to provide seamless call continuity between cellular networks and any network that supports VoIP, for example. The VCC may also provide for interoperability between GSM, UMTS, and CDMA cellular networks and any IP capable wireless access network, for example. The IMS VCC may also support the use of a single phone number or SIP identity and may offer a broad collection of functional advantages, for example, support for multiple markets and market segments, provisioning of enhanced IMS multimedia services, including greater service personalization and control, seamless handoff between circuit-switched and IMS networks, and/or access to services from any IP device.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method is provided for determining a location of a device using femtocell information, substantially as shown in and/or described in connection with at least one of the figures, as set forth more completely in the claims.

These and other advantages, aspects and novel features of the present invention, as well as details of an illustrated embodiment thereof, will be more fully understood from the following description and drawings.

DETAILED DESCRIPTION OF THE INVENTION

Certain embodiments of the invention may be found in a method and system for determining a location of a device using femtocell information. In various embodiments of the invention, a femtocell management entity may be operable to receive global navigation system satellite (GNSS) coordinates of one or more of a plurality of femtocells and one or both of a receive signal strength indication (RSSI) and/or power levels of one or more of the plurality of femtocells, which are managed by the femtocell management entity. The femtocell management entity may be operable to determine a location of a communication device that is derived based on the received GNSS coordinates, RSSI and/or power levels of one or more of the plurality of femtocells. The communication device may be operable to communicate with one or more of the plurality of femtocells and may receive the determined location of the communication device. One or more location based applications and/or services within the communication device may be operable to utilize the received determined location to provide mapping and/or location information.

Figure 1A:
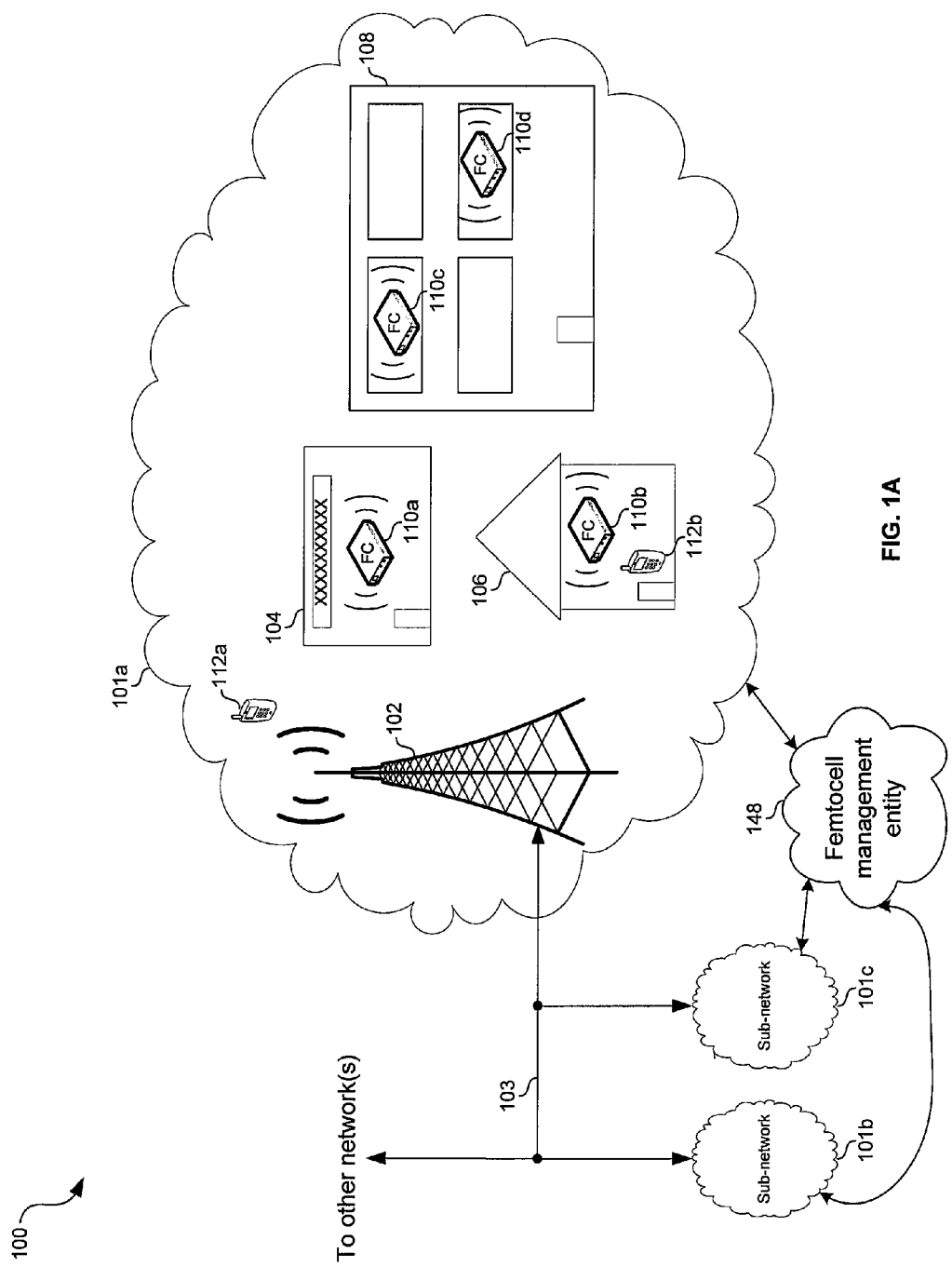
FIG. 1A is a diagram illustrating determination of a location of a device using femtocell information, in accordance with an embodiment of the invention.

FIG. 1A is a diagram illustrating determination of a location of a device using femtocell information, in accordance with an embodiment of the invention. Referring to FIG. 1A, there is shown a cellular network 100 comprising cellular sub-networks 101a, 101b and 101c, and a femtocell management entity 148. The exemplary cellular sub-network 101a may comprise a base station 102, a plurality of installed femtocells 110a, 110b, 110c and 110d, which are collectively referred to herein as femtocells 110, cellular enabled communication devices 112a and 112b, which are collectively referred to herein as cellular enabled communication devices 112. The femtocells 110 may be installed in one or more commercial properties 104, one or more residential properties 106, and/or one or more multi-tenant properties 108.

The commercial properties 104 may comprise, for example, stores, restaurants, offices, and municipal buildings. The residential properties 106 may comprise, for example, single-family homes, home offices, and/or town-houses. Multi-tenant properties 108 may comprise residential and/or commercial tenants such as apartments, condos, hotels, and/or high rises.

The base station 102 may be operable to communicate data wirelessly utilizing one or more cellular standards such as IS-95, CDMA, GSM, TDMA, GPRS, EDGE, UMTS/WCDMA, TD-SCDMA, HSDPA, OFDM, extensions thereto, and/or variants thereof. "Data," as utilized herein, may refer to any analog and/or digital information including but not limited to voice, Internet data, and/or multimedia content. Multimedia content may comprise audio and/or visual content comprising, video, still images, animated images, and/or textual content. The base station 102 may communicate with cellular enabled communication devices such as the cellular enabled communication devices 112. Exemplary cellular standards supported by the base station 102 may be specified in the International Mobile Telecommunications-2000 (IMT-2000) standard and/or developed by the $3^{rd}$ generation partnership project (3GPP) and/or the $3^{rd}$ generation partnership project 2 (3GPP2). The base station 102 may communicate data amongst the various components of the sub-network 101a. Additionally, data communicated to and/or from the base station 102 may be communicated to sub-network 101b, sub-network 101c, and/or to one or more other networks (not shown) via one or more backhaul links 103. In this manner, data communicated to and/or from the base station 102 may be communicated to and/or from, other portions of the network 100 and/or other networks. Exemplary networks with which data may be communicated may comprise public switched telephone networks (PSTN) and/or IP networks such as the Internet or an intranet.

The femtocell management entity 148 may comprise suitable logic, circuitry, and/or code for managing operating parameters of one more installed femtocells 110. The femtocells 110 may each comprise suitable logic, circuitry, and/or code that may be operable to communicate wirelessly utilizing one or more cellular standards such as IS-95, CDMA, GSM, TDMA, GPRS, EDGE, UMTS/WCDMA, TD-SCDMA, HSDPA, OFDM, extensions thereto, and/or variants thereof. In this regard, the femtocells 110 may each communicate with cellular enabled communication devices such as the cellular enabled communication devices 112. Exemplary cellular standards supported by the femtocells 110 may be specified in the International Mobile Telecommunications-2000 (IMT-2000) standard and/or developed by the $3^{rd}$ generation partnership project (3GPP) and/or the $3^{rd}$ generation partnership project 2 (3GPP2). Additionally, the femtocells 110 may each comprise suitable logic, circuitry, and/or code that may be operable to communicate over an IP network (not shown in FIG. 1A).

The cellular enabled communication devices 112 may each comprise suitable logic, circuitry, and/or code that may be operable to communicate utilizing one or more cellular standards. In this regard, the cellular enabled communication devices 112 may each be operable to transmit and/or receive data via the cellular network 100. Exemplary cellular enabled communication devices may comprise laptop computers, mobile phones, and personal media players, for example. The cellular enabled communication devices 112 may be enabled to receive, process, and present multimedia content and may additionally be enabled run a network browser or other applications for providing Internet services to a user of the cellular enabled device 112.

The cellular enabled communication devices 112 may gain access to the cellular network 100 and/or to other communication networks via cellular communications with the base station 102 and the femtocells 110. In this regard, in instances that a reliable connection may be established between the base station 102 and a cellular enabled communication device 112, the data may be communicated between the cellular enabled communication device 112 and the base station 102. Alternatively, in instances that a reliable connection may be established between a femtocell 110 and a cellular enabled communication device 112, data may be communicated between the cellular enabled communication device 112 and the femtocell 110.

In this regard, access by a cellular enabled communication device to a femtocell may comprise an ability of the cellular enabled communication device 112 to establish one or more cellular communication channels with the femtocell. The cellular communication channels between the cellular enabled communication device 112 and the femtocell 110 may enable the cellular enabled communication device 112 to exchange data with, for example, other cellular enabled communication devices, landline telephones, and/or network nodes such as fileservers, which may be communicatively coupled to a local area network and/or the Internet. Accordingly, the femtocells 110 may extend the cellular coverage area in the sub-network 101a. In particular, the femtocells 110 may extend or improve cellular coverage indoors or locations out of range of a base-station.

In operation, the femtocell management entity 148 may be operable to receive one or more parameters, for example, global navigation system satellite (GNSS) coordinates, receive signal strength indication (RSSI) and/or power levels of one or more of the plurality of femtocells, for example, femtocells 110a, 110c and 110d. The femtocell management entity 148 may be operable to determine a location of a communication device 112a based on the received one or more parameters.

Figure 1B:
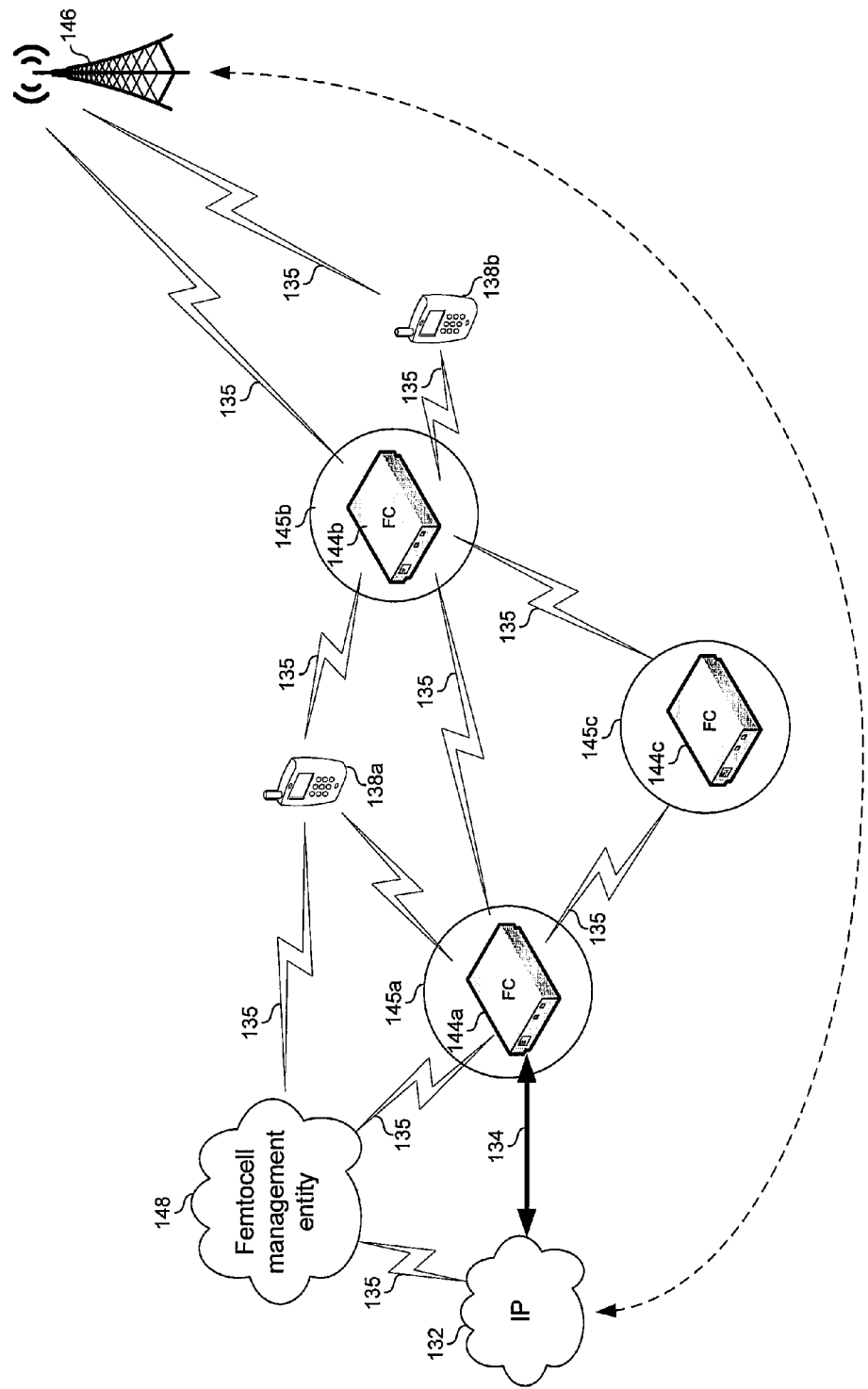
FIG. 1B is a diagram illustrating another embodiment for determining a location of a device using femtocell information, in accordance with an embodiment of the invention.

FIG. 1B is a diagram illustrating another embodiment for determining a location of a device using femtocell information, in accordance with an embodiment of the invention. Referring to FIG. 1B, there is shown a femtocell management entity 148, a plurality of femtocells 144a, 144b and 144c, cellular enabled communication devices 138a and 138b, collectively referred to herein as cellular enabled communication devices 138, and base station 146. The femtocell 144a may be communicatively coupled to an IP network 132 via a link 134. Each of the plurality of femtocells 144a, 144b and 144c may be communicatively coupled to a GNSS receiver, for example. The GNSS receivers communicatively coupled to each of the femtocells 144a, 144b and 144c may be operable to generate the GNSS coordinates of each of the femtocells. For example, the GNSS receivers may be operable to generate the GNSS coordinates 145a, 145b and 145c of the femtocells 144a, 144b and 144c respectively.

The base station 146 may be similar to or the same as the base station 102 described with respect to FIG. 1A, for example. The cellular enabled communication devices 138 may be similar to or the same as the cellular enabled communication devices 112 described with respect to FIG. 1A, for example. The femtocells 144a, 144b and 144c may be similar to or the same as the femtocells 110 described with respect to FIG. 1A, for example.

The IP network 132 may comprise one or more network devices and/or network links operable to transmit and/or receive IP packets. The IP network 132 may provide access to the Internet and/or one or more private networks. The link 134 may comprise a broadband link such as a digital subscriber line (DSL), a T1/E1 line, a cable television infrastructure, a satellite television infrastructure, and/or a satellite broadband Internet link. The link 134 may comprise one or more optical, wired, and/or wireless links.

The cellular enabled device 138a and the cellular enabled device 138b may communicate via the femtocells 144a, 144b and 144c, the base station 146, and the IP network 132. For example, the cellular enabled device 138a may transmit data to the femtocell 144a utilizing one or more cellular standards. The femtocell 144a may packetize the data into one or more IP packets and the IP packets may be further encapsulated, encoded, modulated, or otherwise processed. The IP packets may then be routed via the IP network 132 to the base station 146. In some instances, the base station 146 may utilize IP backloading and the IP packets may be conveyed to the base station 146. In other instances, the IP packets may be transcoded via one or more network elements (not shown in FIG. 1B) to a format supported by the base station 146. The data may then be extracted from the IP packets, transcoded to a format suitable for cellular transmission, and subsequently transmitted to the cellular enabled device 138b.

In operation, the femtocell management entity 148 may be operable to receive one or more parameters, for example, GNSS coordinates 145a, 145b and 145c of the femtocells 144a, 144b and 144c respectively. The femtocell management entity 148 may be operable to receive the power levels and/or the RSSI of the plurality of femtocells, for example, femtocell 144a, 144b and 144c via a plurality of cellular links 135. The cellular link 135 may be enabled to wirelessly communicate the one or more parameters to the femtocell management entity 148 utilizing one or more of: IS-95, CDMA, GSM, TDMA, GPRS, EDGE, UMTS, WCDMA, TD-SCDMA, OFDM, and/or HSDPA cellular standards. The femtocell management entity 148 may be operable to determine the location of a communication device, for example, a cellular enabled device 138a based on the received GNSS coordinates, power levels and/or the RSSI of the plurality of femtocells, for example, femtocell 144a, 144b and 144c. In accordance with an embodiment of the invention, the femtocell management entity 148 may be operable to determine the location of the communication device 138a based on triangulation of three or more of the GNSS coordinates of the plurality of femtocells. For example, the femtocell management entity 148 may be operable to triangulate three or more of the GNSS coordinates of the plurality of femtocells, for example, GNSS coordinates 145a, 145b and 145c of the femtocells 144a, 144b and 144c respectively to determine the location of the communication device 138a.

Figure 1C:
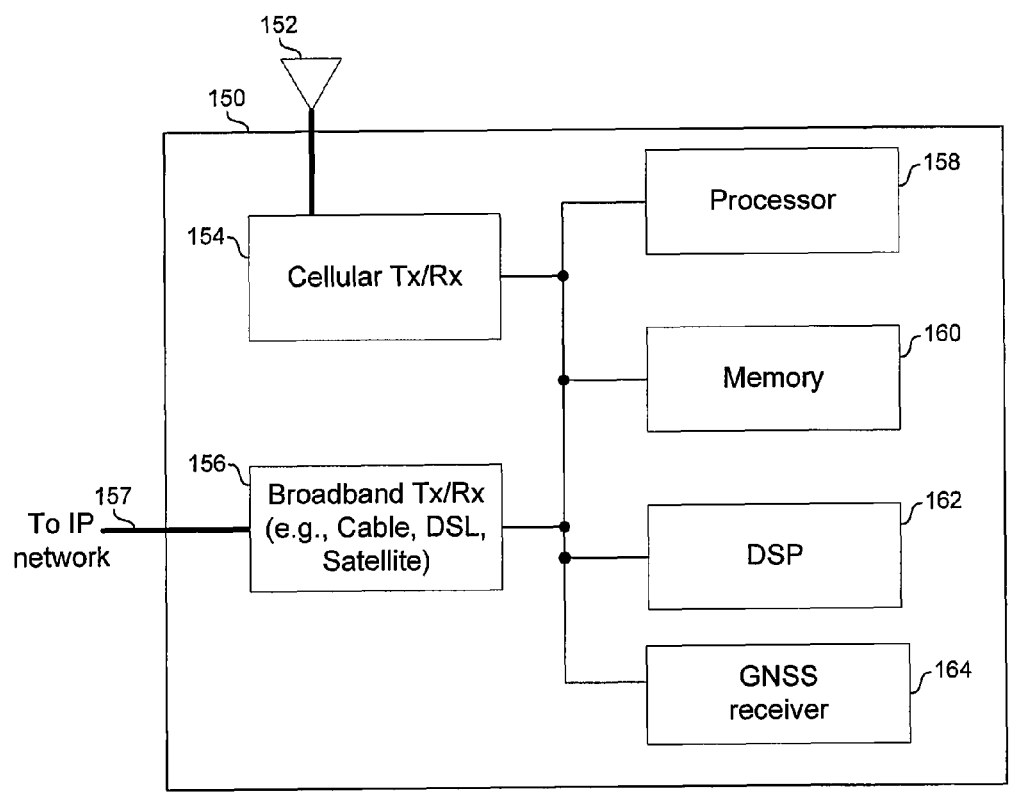
FIG. 1C is a block diagram of an exemplary femtocell, in accordance with an embodiment of the invention.

FIG. 1C is a block diagram of an exemplary femtocell, in accordance with an embodiment of the invention. Referring to FIG. 1C, there is shown a femtocell 150 comprising an antenna 152, a cellular transmitter and/or receiver (Tx/Rx) 154, a broadband transmitter and/or receiver (Tx/Rx) 156, a processor 158, a memory 160, a digital signal processor (DSP) 162, and a global navigation system satellite (GNSS) receiver 164. The femtocell 150 may be similar to or the same as the femtocells 110 described with respect to FIG. 1B. The femtocell 150 may be part of a mesh network of interconnected femtocells.

The antenna 152 may be suitable for transmitting and/or receiving cellular signals. Although a single antenna is illustrated, the invention may not be so limited. In this regard, the cellular Tx/Rx 154 may utilize a common antenna for transmission and reception, or may utilize different antennas for transmission and reception, and/or may utilize a plurality of antennas for transmission and/or reception.

The cellular Tx/Rx 154 may comprise suitable logic circuitry and/or code that may be operable to transmit and/or receive voice and/or data utilizing one or more cellular standards. The cellular Tx/Rx 154 may be operable to perform amplification, down-conversion, filtering, demodulation, and analog to digital conversion of received cellular signals. The cellular Tx/Rx 154 may be operable to perform amplification, up-conversion, filtering, modulation, and digital to analog conversion of transmitted cellular signals. The cellular Tx/Rx 154 may support communication over a plurality of communication channels utilizing time division multiple access (TDMA) and/or code division multiple access (CDMA). Exemplary cellular standards supported by the femtocells 110 may be specified in the International Mobile Telecomunnications-2000 (IMT-2000) standard developed by the 3$^{rd}$ generation partnership project (3GPP) and/or the 3$^{rd}$ generation partnership project 2 (3GPP2). The cellular Tx/Rx 154 may be operable to transmit and/or receive on one or more frequencies and/or channels. One or more of the frequencies and/or one or more of the channels on which the cellular Tx/Rx 154 receives and/or transmits may be configured via one or more control signals from the processor 158, memory 160, and/or the DSP 162. The cellular Tx/Rx 154 may also comprise a received signal strength indicator for characterizing an environment in which the femtocell 150 resides.

The broadband Tx/Rx 156 may comprise suitable logic, circuitry, and/or code that may be operable to transmit voice and/or data in adherence to one or more broadband standards. The broadband Tx/Rx 156 may be operable to perform amplification, down-conversion, filtering, demodulation, and analog to digital conversion of received signals. The broadband Tx/Rx 156 may be operable to perform amplification, up-conversion, filtering, modulation, and digital to analog conversion of transmitted signals. In various exemplary embodiments of the invention, the broadband Tx/Rx 156 may transmit and/or receive voice and/or data over the link 157 which may be a T1/E1 line, optical fiber, DSL, cable television infrastructure, satellite broadband internet connection, satellite television infrastructure, and/or Ethernet. In various exemplary embodiments of the invention, data received via the broadband Tx/Rx 156 may be conveyed to the processor 158, memory 160, and/or the DSP 162 and may be utilized to control one or more frequencies and/or channels on which the cellular Tx/Rx 154 transmits and/or receives.

The processor 158 may comprise suitable logic, circuitry, and/or code that may enable processing data and/or controlling operations of the femtocell 150. In this regard, the processor 158 may be enabled to provide control signals to the various other blocks comprising the femtocell 150. The processor 158 may also control data transfers between various portions of the femtocell 150. Additionally, the processor 158 may enable execution of applications programs and/or code. In various embodiments of the invention, the applications, programs, and/or code may enable, for example, parsing, transcoding, or otherwise processing data. In various embodiments of the invention, the applications, programs, and/or code may enable, for example, configuring or controlling operation of the cellular Tx/Rx 154, the broadband Tx/Rx 156, the DSP 162, and/or the memory 160. In various embodiments of the invention, the applications, programs, and/or code may enable detecting interference and/or controlling cellular one or more frequencies and/or one or more channels on which the cellular Tx/Rx 154 transmits and/or receives. The processor 158 may be operable to determine the current power levels of the femtocell 150. The processor 158 may be operable to determine the signal strength of the received signals from the communication devices, for example, communication device 138a and accordingly calculate the RSSI of the femtocell 150.

The memory 160 may comprise suitable logic, circuitry, and/or code that may enable storage or programming of information that includes parameters and/or code that may effectuate the operation of the femtocell 150. The parameters may comprise configuration data and the code may comprise operational code such as software and/or firmware, but the information need not be limited in this regard. Moreover, the parameters may include adaptive filter and/or block coefficients. Additionally, the memory 160 may buffer or otherwise store received data and/or data to be transmitted. In various embodiments of the invention, the memory 160 may comprise one or more look-up tables utilized for determining cellular devices within a coverage area of the femtocell 150. In various embodiments of the invention, the memory 160 may comprise one or more look-up tables or other data structures which may comprise information controlling one or more frequencies and/or one or more channels on which the cellular Tx/Rx 154 transmits and/or receives.

The DSP 162 may comprise suitable logic, circuitry, and/or code operable to process audio and/or video signals. In various embodiments of the invention, the DSP 162 may encode, decode, modulate, demodulate, encrypt, and/or decrypt voice and/or data signals. In this regard, the DSP 162 may be operable to perform computationally intensive processing of voice and/or data signals. In various embodiments of the invention, the DSP 162 may be operable to detect interference and/or control one or more frequencies and/or one or more channels on which the cellular Tx/Rx 154 transmits and/or receives. The DSP 162 may be operable to perform, for example, fast Fourier transform analysis (FFT) of received signals to characterize an environment in which the femtocell 150 resides.

The GNSS receiver 164 may comprise suitable logic, circuitry, and/or code operable to determine the location of the femtocell 150 based on receiving one or more signals from a plurality of satellites. The GNSS receiver 164 may be operable to determine the GNSS coordinates of the femtocell 150. The GNSS receiver 164 may be operable to update the GNSS coordinates of the femtocell 150 when the femtocell 150 has been relocated to a different location based on one or more signals received from a plurality of satellites.

In accordance with an embodiment of the invention, the processor 158 may be operable to communicate one or more parameters, for example, GNSS coordinates, power levels and/or the RSSI of the femtocell to the femtocell management entity 148. The femtocell management entity 148 may be operable to utilize the one or more parameters to determine the location of a communication device 138a.

The one or more frequencies and/or channels on which the cellular Tx/Rx 154 may transmit and/or receive may also be determined, at least in part, based on data received via the broadband Tx/Rx 156. In this regard, other femtocells and/or base stations may characterize the environment in which they are operating and may communicate results of those characterizations over, for example, an IP network to which the femtocell 150 is communicatively coupled. In various embodiments of the invention, characterizing an environment may comprise measuring one or more parameters, such as measuring signal strengths on one or more frequencies and/or channels to determine potential interference with other installed femtocells, measuring power levels, measuring directionality of antennas and communicating the measured parameters to a femtocell management entity 148 for processing. In this manner, signals which may interfere with cellular communications with the femtocell 150 may be detected.

In operation, information may be exchanged, via the broadband Tx/Rx 156, between the femtocell 150 and a femtocell management entity. The exchanged information may be communicated utilizing, for example, the Internet Protocol (IP). The exchanged information may enable managing access to the femtocell 150 by one or more cellular enabled communication devices. Information may be exchanged between the femtocell 150 and the femtocell management entity via the broadband TxRx 156. The information from the femtocell management entity may update one or more tables, lists, databases, or other data structures within the femtocell 150 that may determine permissions and/or track usage and/or billing for cellular enabled communication devices. In some embodiments of the invention, a cellular enabled communication device may connect to the femtocell management entity via a reserved channel provided by the cellular Tx/Rx 154. In this regard, data destined for the femtocell management entity from a cellular communication device may be received at the cellular Tx/Rx 154 which may down-convert, de-capsulate, and/or otherwise process the data. Additionally, the processor 158, memory 160, and/or DSP 162 may process the data prior to conveying the data to the broadband Tx/Rx 156. The broadband Tx/Rx 156 may then encapsulate, up-convert, and/or otherwise process the data and transmit the data to the femtocell management entity. Similarly, data destined for a cellular communication device from the femtocell management entity may be received at the broadband Tx/Rx 156 which may down-convert, de-capsulate, and/or otherwise process the data. Additionally, the processor 158, memory 160, and/or DSP 162 may process the data prior to conveying the data to the cellular Tx/Rx 154. The cellular Tx/Rx 154 may then encapsulate, up-convert, and/or otherwise process the data and transmit the data to the cellular enabled communication device.

Figure 2:
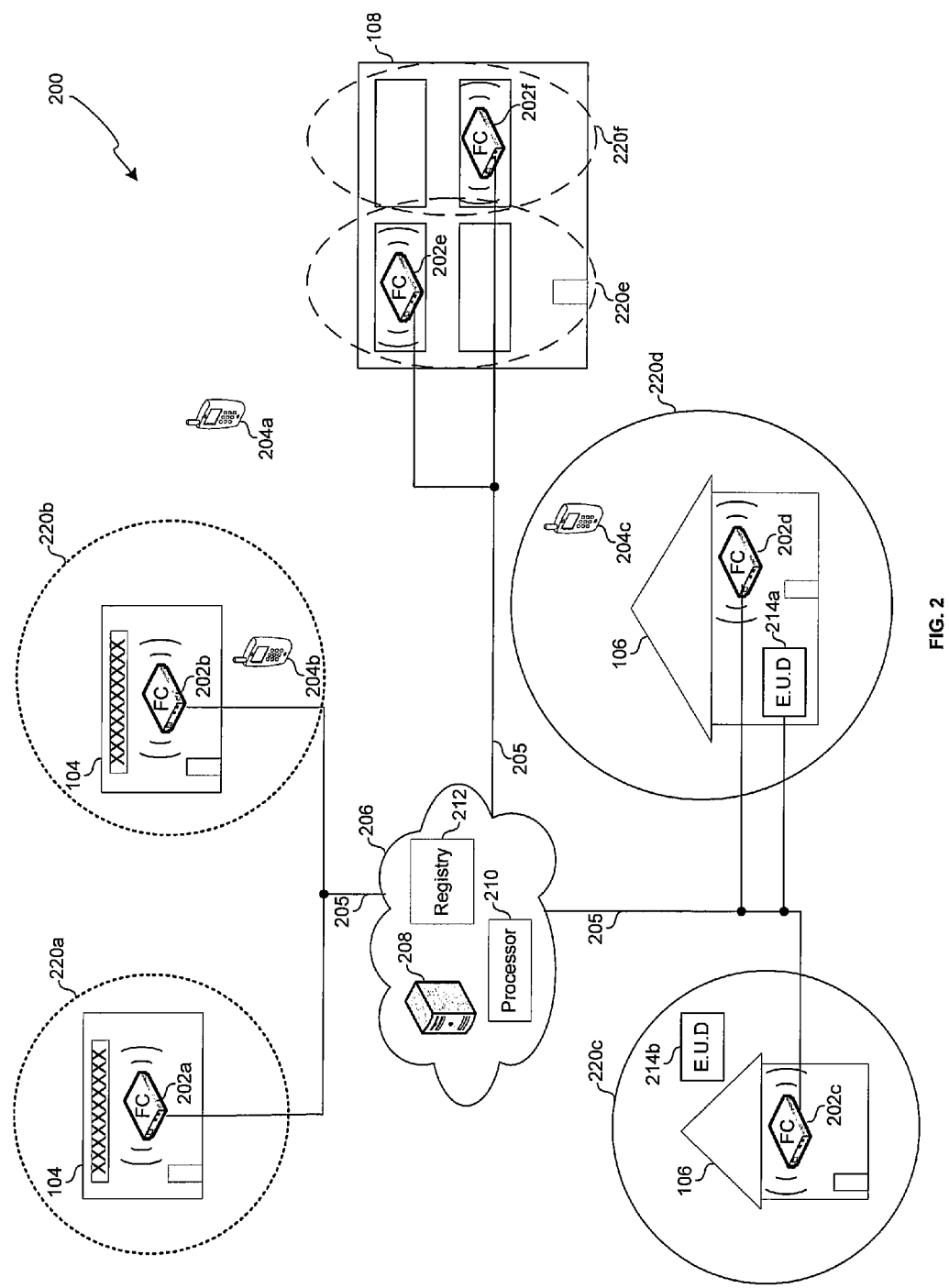
FIG. 2 is a diagram illustrating a geographic area comprising a plurality of femtocells managed via a management entity for determining a location of a device using femtocell information, in accordance with an embodiment of the invention.

FIG. 2 is a diagram illustrating a geographic area comprising a plurality of femtocells managed via a management entity for determining a location of a device using femtocell information, in accordance with an embodiment of the invention. Referring to FIG. 2, there is shown a communication system 200. The communication system 200 may comprise a plurality of commercial properties 104, residential properties 106, multi-tenant properties 108, a plurality of femtocells 202a, 202b, 202c, 202d, 202e and 202f, a plurality of cellular enabled communication devices 204a, 204b and 204c, end-user communication devices 214a and 214b, and a femtocell management entity 206.

The commercial properties 104, the residential properties 106, and the multi-tenant properties 108 may be substantially as described with respect to FIG. 1A. The cellular enabled communication devices 204a, 204b, and 204c may be similar to or the same as the cellular enabled communication devices 112a and 112b (FIG. 1A) and/or 138a and 138b (FIG. 1B). Exemplary cellular enabled communication devices comprise cell phones and laptops with a cellular data card. In some instances, the cellular enabled communication devices 204a, 204b, and 204c may be enabled to communicate with the femtocell management entity 206.

Each of the end-user communication devices 214a and 214b may comprise one or more of a cellular enabled communication device, similar to or the same as the devices 204a, 204b, and 204c, a wireless communication device such as a Bluetooth and/or Wi-Fi enabled device, and/or a wired communication device such as a computer with an Ethernet port. The end-user communication device 214a and 214b may be operable to communicate with the femtocell management entity 206.

The plurality of femtocells 202a, 202b, 202c, 202d, 202e and 202f, which are collectively referred to as femtocells 202, may be similar to or the same as the femtocells 110 (FIG. 1A), 144 (FIG. 1B), and/or 150 (FIG. 1C). The femtocells 202 may each be enabled to communicate with the femtocell management entity 206 via, for example, an IP connection.

The plurality of femtocells 202a, 202b, 202c, 202d, 202e and 202f may be established via the femtocell management entity 206. The femtocell management entity 206 may comprise suitable logic, circuitry, and/or code for managing operating parameters of one more installed femtocells 202a, 202c, 202d, 202e and 202f. In various embodiments of the invention, the femtocell management entity 206 may comprise an application specific device or plurality of devices. Alternatively, the femtocell management entity 206 may reside on and/or be enabled by one or more servers 208, a processor 210 and a registry 212, which may manage various parameters of communication channels over which the femtocells 202 may communicate. For example, the femtocell management entity 206 may comprise one or more web pages, databases, and/or web based applications which may be accessed via an IP network. In determining values for the various parameters, the femtocell management entity 206 may utilize feedback received from the femtocells 202. After determining the parameter values, the femtocell management entity 206 may communicate the determinations to the femtocells 202.

In accordance with an embodiment of the invention, the processor 210 in the femtocell management entity 206 may be operable to receive one or more parameters from one or more installed femtocells, for example, femtocells 202a, 202c, 202d, 202e and 202f. The received one or more parameters may comprise GNSS coordinates, power levels and/or the RSSI of the plurality of femtocells 202a, 202c, 202d, 202e and 202f. The processor 210 may be operable to determine a location of a communication device 204b based on the received one or more parameters. The processor 210 may be operable to dynamically update a registry 212 at the femtocell management entity 206 based on the received one or more parameters from the one or more installed femtocells, for example, femtocells 202a, 202b, 202c, 202d, 202e and 202f and/or the one or more cellular enabled communication devices, for example, 204a, 204b and 204c. The dynamically updated registry 212 may comprise one or more of global navigation system satellite (GNSS) coordinates, an identification number, potential interference, power levels, associated communication devices, RSSI and/or directionality of antennas of one or more of the plurality of femtocells, for example, femtocells 202a, 202b, 202c, 202d, 202e and 202f. For example, the registry 212 may comprise the GNSS coordinates 220a of femtocell 202a, GNSS coordinates 220b of femtocell 202b, GNSS coordinates 220c of femtocell 202c, GNSS coordinates 220d of femtocell 202d, GNSS coordinates 220e of femtocell 202e and GNSS coordinates 220f of femtocell 202f.

The registry 212 may be updated upon installing and/or powering up of one or more of the plurality of femtocells, for example, femtocells 202a, 202b, 202c, 202d, 202e and 202f. The registry 212 may be updated upon command from a network administrator. The femtocell management entity 206 may be operable to receive the GNSS coordinates, RSSI and/or power levels of the plurality of femtocells, for example, femtocells 202a, 202b, 202c, 202d, 202e and 202f via a cellular link 205. The cellular link 205 may be operable to transmit and/or receive cellular data wirelessly utilizing one or more standards comprising IS-95, CDMA, GSM, TDMA, GPRS, EDGE, UMTS, WCDMA, TD-SCDMA, OFDM and/or HSDPA cellular standards.

Figure 3:
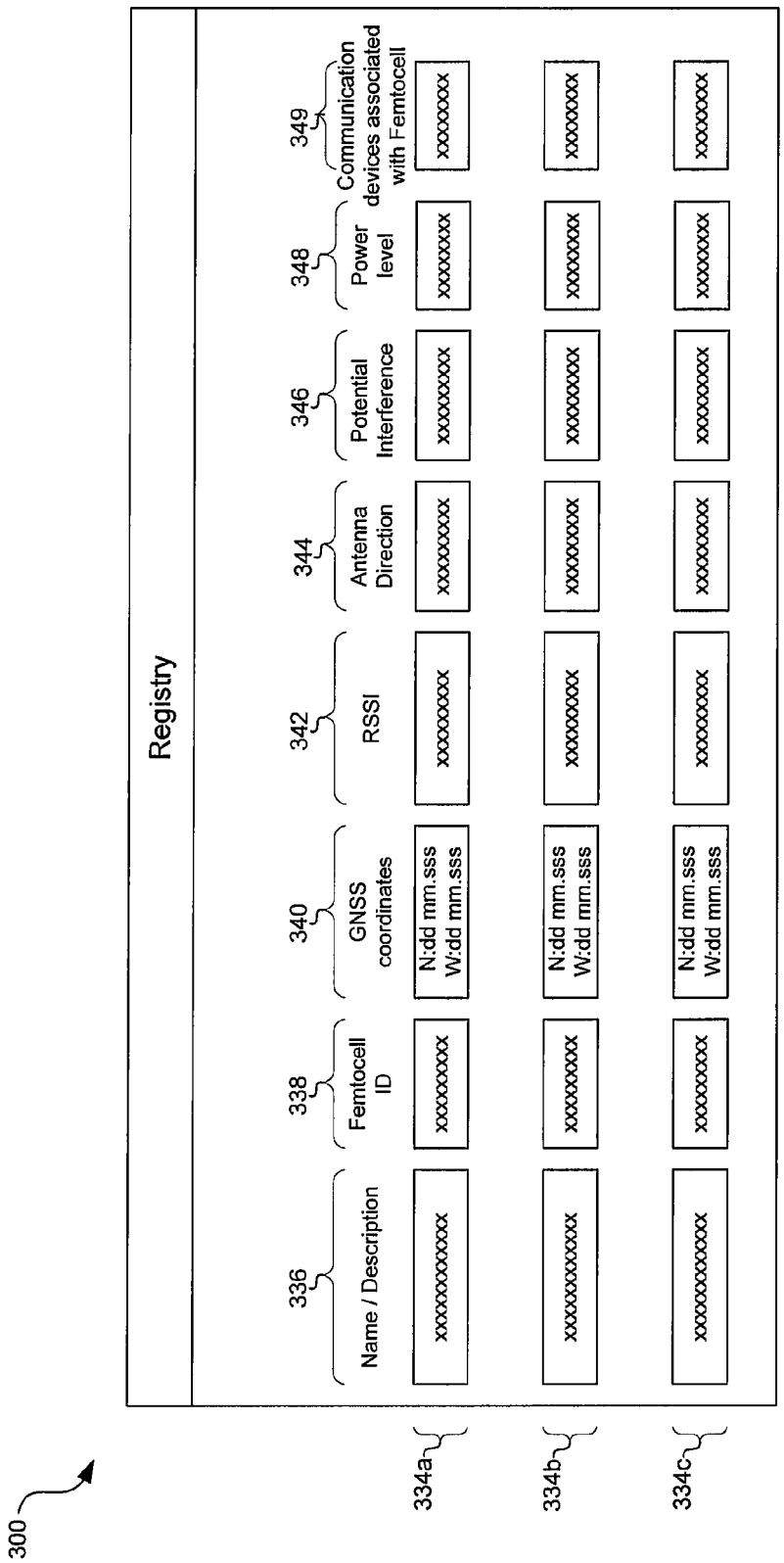
FIG. 3 is a diagram illustrating an exemplary registry in a femtocell management entity, in accordance with an embodiment of the invention.

FIG. 3 is a diagram illustrating an exemplary registry in a femtocell management entity, in accordance with an embodiment of the invention. Referring to FIG. 3, the registry 300 comprises femtocell entries 334a, 334b, and 334c, collectively referred to herein as entries 334. Although only three entries 334 are depicted, the invention may not be so limited and any number of entries may be displayed. Each entry 334 may comprise a name and/or description field 336, a femtocell identification field 338, a GNSS coordinates field 340, a RSSI field 342, an antenna direction field 344, a potential interference field 346, a power level field 348, and an associated communication devices field 349.

The name and/or description field 336 may provide information to uniquely describe a femtocell. The femtocell identification field 338 may comprise information such as make, model, and serial number of a femtocell. Additionally or alternatively, the femtocell identification field 338 may comprise an alphanumeric identifier assigned to a femtocell by the femtocell's owner and/or operator. In some embodiments of the invention, the femtocell identification field 338 may comprise a unique key or number similar to or the same as an international mobile subscriber identity (ISMI) utilized by GSM and UMTS cellular networks.

The GNSS coordinates field 340 may indicate the current GNSS coordinates of an installed femtocell. The RSSI field 342 may indicate the receive signal strength of one or more packets received from the communication device 204a. The antenna direction field 344 may indicate the current direction of the antenna in the installed femtocell. The potential interference field 346 may indicate the level of potential interference between the plurality of femtocells. The power levels field 348 may indicate the power level of the installed femtocell, and accordingly, the range of the femtocell. The associated communication devices field 349 may indicate the identity of one or more communication devices, for example, 204a and 204b associated with a femtocell, for example, femtocell 202b. The RSSI field 342, power levels field 348, and the GNSS coordinates field 340 may enable a user of the end-user communication device 204a to determine a location of the communication device 204a.

In an exemplary embodiment of the invention, the plurality of parameters in the registry 300 may be dynamically updated based on receiving one or more of the parameters from the plurality of installed femtocells. The registry 300 may be updated upon installing and/or powering up of one or more of the plurality of femtocells. The registry 300 may also be updated upon command from a network administrator.

Figure 4:
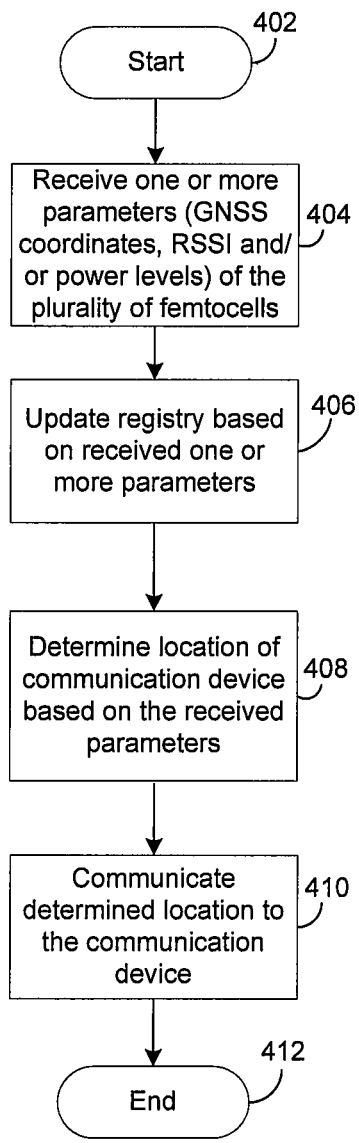
FIG. 4 is a flow chart illustrating exemplary steps for determining a location of a device using femtocell information, in accordance with an embodiment of the invention.

FIG. 4 is a flow chart illustrating exemplary steps for determining a location of a device using femtocell information, in accordance with an embodiment of the invention. Referring to FIG. 4, exemplary steps may begin at step 402. In step 404, a femtocell management entity may receive one or more parameters, such as GNSS coordinates, RSSI and/or power levels of one or more femtocells. In step 406, a registry at the femtocell management entity may be dynamically updated based on the received one or more parameters. In step 408, the femtocell management entity maybe operable to determine a location of a communication device based on the received parameters. In step 410, the determined location may be communicated to the communication device. Control then returns to step 412.

In accordance with an embodiment of the invention, a method and system for determining a location of a device using femtocell information may comprise a communication system 200. The communication system 200 may comprise a plurality of femtocells, for example, femtocells 202a, 202b, 202c, 202d, 202e and 202f and a femtocell management entity 206 that may coordinate operation of the plurality of femtocells, for example, femtocells 202a, 202b, 202c, 202d, 202e and 202f. The femtocell management entity 206 may be operable to receive global navigation system satellite (GNSS) coordinates of one or more of the plurality of femtocells, for example, femtocells 202a, 202b, 202c, 202d, 202e and 202f and one or both of a receive signal strength indication (RSSI) and/or power levels of one or more of the plurality of femtocells, for example, femtocells 202a, 202b, 202c, 202d, 202e and 202f. The femtocell management entity 206 may be operable to utilize the received GNSS coordinates, RSSI and/or power levels of one or more of the plurality of femtocells, for example, femtocells 202a, 202b, 202c, 202d, 202e and 202f to determine a location of a communication device 204a. The communication device 204a may be operable to receive the determined location of the communication device 204a from the femtocell management entity 206. One or more location based services and/or applications running on the communication device 204a may utilize the received determined location to provide mapping and/or location information. In accordance with an embodiment of the invention, the femtocell management entity 206 may be operable to determine the location of the communication device 204a based on triangulation of three or more of the GNSS coordinates of the plurality of femtocells, for example, femtocells 202a, 202b, 202c, 202d, 202e and 202f. Notwithstanding, the invention may not be so limited and other satellite navigation techniques may be utilized to determine the location of the communication device without limiting the scope of the invention.

The femtocell management entity 206 may be operable to update a registry 212 based on the communicated GNSS coordinates, RSSI and/or power levels of one or more of the plurality of femtocells, for example, femtocells 202a, 202b, 202c, 202d, 202e and 202f. The registry 212 may comprise one or more of GNSS coordinates, an identification number, potential interference, power levels, associated communication devices, RSSI and/or directionality of antennas of one or more of the plurality of femtocells, for example, femtocells 202a, 202b, 202c, 202d, 202e and 202f. The registry 212 may be updated upon installing and/or powering up of one or more of the plurality of femtocells, for example, femtocells 202a, 202b, 202c, 202d, 202e and 202f. The registry 212 may be updated upon command from a network administrator. The femtocell management entity 206 may be operable to receive the GNSS coordinates, RSSI and/or power levels of the plurality of femtocells, for example, femtocells 202a, 202b, 202c, 202d, 202e and 202f via a cellular link 205. The cellular link 205 may be operable to transmit and/or receive cellular data wirelessly utilizing one or more standards comprising IS-95, CDMA, GSM, TDMA, GPRS, EDGE, UMTS, WCDMA, TD-SCDMA, OFDM and/or HSDPA cellular standards.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein for determining a location of a device using femtocell information.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will include all embodiments falling within the scope of the appended claims.

What is claimed is:

1. A method for performing location-based processes in a wireless communication environment, the method comprising:
   receiving, by a managing device that is configured to communicate with a plurality of femtocells, global navigation system satellite (GNSS) coordinates, a receive signal strength indication (RSSI), and a power level from each of the plurality of femtocells;
   calculating, by the managing device, a location of a communication device in the wireless communication environment based on the received GNSS coordinates, RSSIs, and power levels;
   transmitting, by the managing device to the communication device, the calculated location of the communication device; and
   updating, by the managing device, a registry based on the GNSS coordinates, RSSIs, and power levels received from the plurality of femtocells,
   wherein each of the GNSS coordinates identifies respective locations of the respective femtocells, and
   wherein the registry includes: the GNSS coordinates, an identification number, the power levels, associated communication devices, the RSSIs, and directionality of antennas of the plurality of femtocells.

2. The method of claim 1, wherein each of the RSSIs correspond to an RSSI of a signal received by the respective femtocells from the communication device, and
   wherein each of the power levels correspond to a power level of the signal received by the respective femtocells from the communication device.

3. The method of claim 1, wherein the managing device determines the location of the communication device based on triangulation of received GNSS coordinates from at least three femtocells.

4. The method of claim 1, wherein the managing device updates the registry upon a powering up of at least one of the plurality of femtocells.

5. The method of claim 1, wherein the managing device updates the registry upon receipt of a command from a network administrator.

6. The method of claim 1, wherein the managing device receives the GNSS coordinates, the RSSIs, and the power levels via a cellular link.

7. The method of claim 6, wherein the cellular link is operable to convey transmitted or received cellular data wirelessly utilizing at least one of IS-95, CDMA, GSM, TDMA, GPRS, EDGE, UMTS, WCDMA, TD-SCDMA, OFDM and HSDPA cellular standards.

8. The method of claim 1, wherein each of the plurality of femtocells includes a GNSS receiver, and
   wherein each of the plurality of femtocells acquires its corresponding GNSS coordinates via its corresponding GNSS receiver.

9. An apparatus capable of performing location-based processes in a wireless communication environment, the system comprising:
   a managing device configured to communicate with a plurality of femtocells and to receive global navigation system satellite (GNSS) coordinates, a receive signal strength indication (RSSI), and a power level from each of the plurality of femtocells; and
   a registry that stores the GNSS coordinates, an identification number, the power levels, associated communication devices, the RSSIs, and directionality of antennas of the plurality of femtocells,
   wherein the managing device is configured to calculate a location of a communication device in the wireless communication environment based on the received GNSS coordinates, RSSIs, and power levels, and to cause the location of the communication device to be transmitted to the communication device;
   wherein each of the GNSS coordinates identifies respective locations of the respective femtocells, and
   wherein the managing device is configured to update the registry based on the received GNSS coordinates, RSSIs, and power levels.

10. The apparatus of claim 9, wherein each of the RSSIs corresponds to an RSSI of a signal received by the respective femtocells from the communication device, and
    wherein each of the power levels corresponds to a power level of the signal received by the respective femtocells from the communication device.

11. The apparatus of claim 9, wherein the managing device is configured to determine the location of the communication device based on triangulation of received GNSS coordinates from at least three femtocells.

12. The apparatus of claim 9, wherein the managing device is configured to update the registry upon a powering up of at least one of the plurality of femtocells.

13. The apparatus of claim 9, wherein the managing device is configured to update the registry upon receipt of a command from a network administrator.

14. A method for performing a location-based process in a wireless communication environment, the method comprising:
    receiving, by a managing device in communication with a first femtocell and a second femtocell, a first set of parameters from the first femtocell and a second set of parameters from the second femtocell;
    determining, by the managing device, a location of a communication device in the wireless communication environment based on the first set of parameters and the second set of parameters;
    communicating, by the managing device, the determined location of the communication device to the communication device;
    updating, by the managing device, a registry based on the received first set of parameters and second set of parameters,
    wherein the first set of parameters includes global navigation system satellite (GNSS) coordinates of the first femtocell corresponding to a GNSS coordinate location of the first femtocell, a receive signal strength indication (RSSI) of a signal received by the first femtocell from the communication device, a power level of a signal received by the first femtocell from the communication device, and an antenna direction of an antenna of the first femtocell, and wherein the second set of parameters includes global navigation system satellite (GNSS) coordinates of the second femtocell corresponding to a GNSS coordinate location of the second femtocell, a receive signal strength indication (RSSI) of a signal received by the second femtocell from the communication device, a power level of a signal received by the second femtocell from the communication device, and an antenna direction of an antenna of the second femtocell, wherein the registry includes the first set of parameters, the second set of parameters, an identification number of the first femtocell, an identification number of the second femtocell, communication devices associated with the first femtocell, and communication devices associated with the second femtocell.

15. The method of claim 14, further comprising storing, by the managing device, the first and second set of parameters in the registry.

16. The method of claim 15, further comprising updating the first and second set of parameters stored in the registry upon a powering up of at least one of the femtocells or upon receipt of a command from the network administrator.

* * * * *

UNITED STATES PATENT AND TRADEMARK OFFICE
CERTIFICATE OF CORRECTION

PATENT NO.       : 8,964,635 B2  
APPLICATION NO.  : 12/418257  
DATED            : February 24, 2015  
INVENTOR(S)      : Abraham et al.

Page 1 of 1

It is certified that error appears in the above-identified patent and that said Letters Patent is hereby corrected as shown below:

In the Claims

Column 13, Line 47  
Please replace "each of the RSSIs correspond" with --each of the RSSIs corresponds--.

Column 13, Line 50  
Please replace "each of the power levels correspond" with --each of the power levels corresponds--.

Signed and Sealed this  
Twenty-third Day of June, 2015

Michelle K. Lee  
*Director of the United States Patent and Trademark Office*